June 30, 1964 H. KUTHROFF 3,138,868
HAND HELD PLATE GLASS CUTTER AND SUPPORT MEANS THEREFOR
Filed Feb. 27, 1963
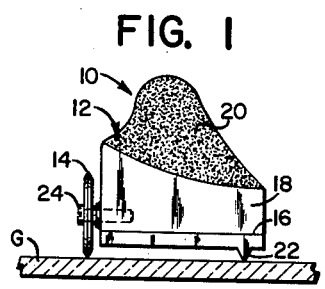
FIG. 1
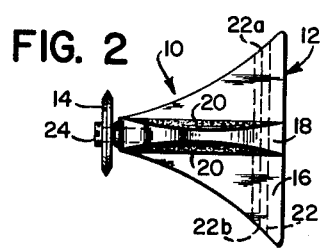
FIG. 2
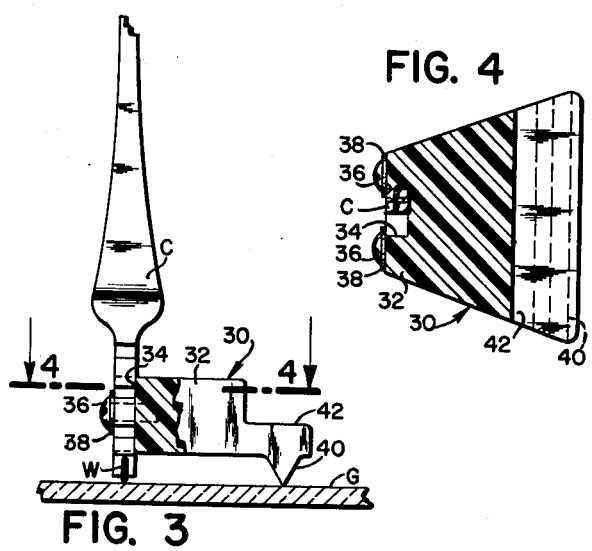
FIG. 3
FIG. 4
FIG. 5
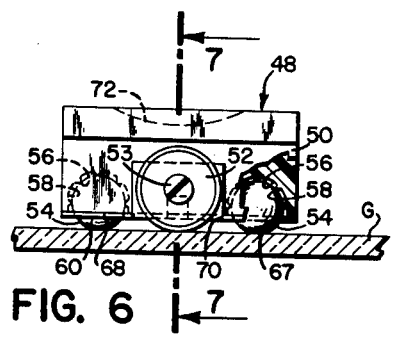
FIG. 6
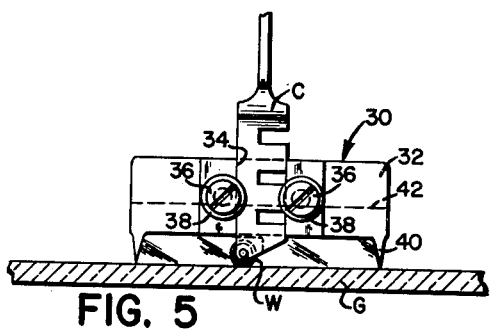
FIG. 7
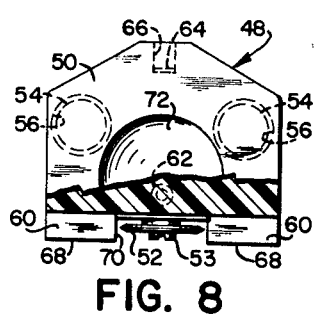
FIG. 8
INVENTOR.
HARRY KUTHROFF
BY
Leonard H. King
ATTORNEY 3,138,868
HAND HELD PLATE GLASS CUTTER AND
SUPPORT MEANS THEREFOR
Harry Kuthroff, 1501 E. 4th St., Brooklyn 30, N.Y.
Filed Feb. 27, 1963, Ser. No. 261,440
3 Claims. (Cl. 30—164.95)

This invention relates to hand held glass cutters and more particularly to support means associated therewith, said support means being adapted to maintain the glass cutter substantially perpendicular to the plane of the glass being cut.

In popular use today is a conventional glass cutter comprising a handle in which is mounted a rotatable, hardened steel cutting wheel. The cutter has retained this configuration for many years with little improvement thereto. The cutter is used by grasping the handle and running the wheel along the surface of the glass with sufficient pressure to produce a score line. The glass is then snapped so that it breaks along the score line. However, this requires a great deal of skill which the average individual lacks, and which in fact is a problem, even though of a lesser degree, to a skilled worker. If the score line is not made evenly and with uniform pressure, there is a danger of flying fragments when the glass is snapped. Even if this does not happen, there still remains the possibility of breaking the glass irregularly causing a ragged edge which could make the glass unusable.

The present invention overcomes these defects and in addition, is easy to use by even the most unskilled individual. The apparatus is hand held and may be successfully employed by an individual of ordinary dexterity. It is inexpensive to manufacture from simple plastic moldings, die-castings and sheet metal parts. When not in use, the cutter of the present invention requires no more storage space than the conventional glass cutters.

Essentially, the glass cutter of the present invention comprises a body member in which a cutting wheel is rotatably mounted. Spaced from the cutting wheel is a support member which is adapted to slide in the direction of the cutting wheel and, in addition, give support to the cutting wheel. More particularly, the support member retains the cutting wheel in a perfectly perpendicular plane with respect to the glass to be cut and allows it to slide easily thereon.

Accordingly, it is an object of the present invention to provide an improved, inexpensive, hand held glass cutter.

An additional object is to provide an adapter for conventional glass cutters, said adapter maintaining the cutting wheel perpendicular to the plane of the glass when in use.

A further object is to provide a glass cutter that is usable by even an inexperienced individual.

Another object is to provide a glass cutter that is supported substantially perpendicular to the plane of the glass when being moved along the surface thereof.

These and other objects of this invention will, in part, be pointed out with particularity and will, in part, be apparent from the following description together with the accompanying drawing.

In the drawing:

FIG. 1 is a side elevation of the glass cutter of the present invention.

FIG. 2 is a plan view of the embodiment of FIG. 1.

FIG. 3 is a side elevation of an alternative embodiment, partially in section.

FIG. 4 is a plan view taken along line 4—4 of FIG. 3.

FIG. 5 is a front view of the embodiment of FIG. 3.

FIG. 6 is a front view of an alternative embodiment, partially in section.

FIG. 7 is a side view in section taken along line 7—7 of FIG. 6.

FIG. 8 is a plan view of the embodiment of FIG. 6 partially in section.

Referring now to the drawings, there is shown in FIG. 1 and FIG. 2, one embodiment of the present invention. Glass cutter 10 is comprised of a body member 12 and a hardened, steel cutting wheel 14. Body member 12 may conveniently be formed of plastic with a base portion 16 and an upright finger grip member 18 integral therewith. The upright finger grip is provided, in the embodiment illustrated, with a roughed-up portion 20 which may be gripped by the thumb and index finger of the user. Depending from the underside of base portion 16 is an elongated supporting rib 22 positioned such that it is spaced apart from and is parallel to the plane of cutting wheel 14. Additionally, rib 22 is dimensioned so that the cutting wheel will be substantially perpendicular to the plane of glass G to be cut when both the wheel and rib are in engagement therewith during the line-scoring operation, as seen in FIG. 1. Stability is provided by ends 22a and 22b of rib 22 and the tangent point of the cutting wheel which define a triangle as viewed from the top (FIG. 2). Cutting wheel 14 is rotatably secured to body member 12 by threaded stud 24. Alternatively, a pivot pin may be press fit into the body member to perform the same function. There has thus been provided a structure that will maintain the cutting wheel in a substantially perpendicular position even when vertical pressure is brought to bear against it during the line-scoring operation. While the structure is very rigid and suitable for straight line work, it is still adaptable to scoring curved or irregular lines, since rib 22 is only in edge contact with the glass and the device may be guided along an irregular line by hand.

FIGS. 3, 4 and 5 illustrate an adapter 30 for conventional glass cutters. Body member 32 is provided with a cut-out 34 to receive cutter body C which is retained therein by clamping means comprising a pair of spaced screws 36, threaded into the front face of body member 32. To enlarge the gripping area of the clamping means, a pair of washers 38 are provided beneath the heads of screws 36 whereby the cutter is clamped at a point above the cutting wheel. It is to be understood that other clamping means may be employed without departing from the spirit of the invention. Spaced from the front surface of body member 32 is a downwardly depending rib member 40. To properly use adapter 30, the glass cutter C is clamped in such a position that it is substantially perpendicular to the plane of glass G when both cutting wheel W and rib member 40 are in contact with glass G. Further facilitating the use of adapter 30 is the provision of ledge 42 in the top and rear surfaces of body member 32. When in use, cutter C is gripped, as usual, between the thumb and index finger, the remaining fingers being accommodated by ledge 42. In this manner, adequate pressure may be applied to the cutter with the cutting wheel maintained in a plane perpendicular to that of the glass. This will assure a clean, even and uniform score line about which the glass may be snapped.

In FIGS. 6, 7 and 8, there is shown an alternative embodiment 48 of the FIG. 1 glass cutter. Body member 50, which may be molded of plastic, as shown, or die cast in metal, has a hardened, steel cutting wheel 52 rotatably journaled in its front face by means of stud 53. Spherical rollers 54 are positioned in the underside of body member 50 such that they protrude therefrom and such that their lowermost points lie in a common, horizontal plane with the lowermost point of cutting wheel 52. This construction serves to maintain the cutting wheel perpendicular to the plane of the glass thus assuring a uniformly scored line. Spherical rollers 54 are positioned in concave, oversized seats 56, each having a plurality of inwardly facing projections 58 designed to permit free, low friction rotation of the rollers and therefore free movement of the cutting wheel. Also provided is a plate 60 serving the dual function of roller retainer and guide means. Plate 60 is positioned on the underside of body member 50, being secured thereto by screw 62 and accurately located by tab 64 bent up into slot 66 in lower, rearward surface of body member 50. Plate 60 is also provided with a plurality of apertures 67, somewhat smaller than the diameter of rollers 54, which serve to retain the rollers. The front edge 68 of plate 60 is notched at 70 to provide clearance for cutting wheel 52; the remaining portion of edge 68 protrudes beyond the plane of the cutting wheel and may conveniently serve as a guide edge when the apparatus is moved along either a straight edge or an irregular template, the contour of which is desired to be copied. A concave recess 72 is formed in the top surface of body member 50 to accommodate the index finger of the user. With the thumb and middle finger positioned on either side and the remaining fingers resting on sloping surface 74 of body member 50, glass cutter 48 may be easily held in one hand and manipulated as desired while adequate pressure is applied thereto.

As a matter of definition, each of the body members, as particularly illustrated in plan views 2, 4 and 8 has a width dimension measured in a direction parallel to the line of movement of the cutting wheel. Each body member also has a depth dimension transverse and substantially equal to the width dimension. Each of the embodiments illustrated the cutting wheel is positioned substantially at the mid-point of the width dimension.

The various embodiments described and illustrated are practical and inexpensive means to hold a rotatable cutting wheel against a glass surface whereby sufficient pressure may be applied in order to score a line without the fear of scribing an inaccurate line.

There has been disclosed heretofore the best embodiments of the invention presently contemplated and it is to be understood that various changes and modifications may be made by those skilled in the art without departing from the spirit of the invention.

What is claimed is:

1. A glass cutter for sheet glass comprising:
   (A) a body member having at least one width dimension substantially equal to a transverse depth dimension;
   (B) a cutting wheel having a cutting edge, said wheel being rotatably journalled in said body member at substantially the mid-point of said width dimension;
      (a) the cutting edge of said wheel extending below said body member to be in contact with the glass when in use; and
   (C) support means depending downwardly from said body member and adapted to rest on the surface of the glass being cut;
      (a) said support means comprising a rib member extending parallel to the plane of said cutting wheel, the ends of said rib member and the peripheral edge of said wheel tangent to the glass defining a triangle in a horizontal plane whereby said body member is accurately positioned parallel to the plane of the glass;
      (b) said support means being spaced from said cutting wheel thereby maintaining said cutting wheel substantially perpendicular to the plane of the glass when said cutting wheel and said support means are both in contact with the glass.

2. A glass cutter for sheet glass comprising:
   (A) a body member having at least one width dimension substantially equal to a transverse depth dimension;
   (B) a cutting wheel having a cutting edge said wheel being rotatably journalled in said body member at substantially the mid-point of said width dimension;
      (a) a cutting edge of said wheel extending below said body member to be in contact with the glass when in use;
   (C) support means depending downwardly from said body member and adapted to rest on the surface of the glass being cut; and
      (a) said support means being spaced from said cutting wheel thereby maintaining said cutting wheel substantially perpendicular to the plane of the glass when said cutting wheel and said support means are both in contact with the glass;
   (D) guide means integral with said body member, said guide means disposed parallel to the plane of and extending beyond said cutting wheel whereby, when in use, said cutting wheel is maintained in a substantially vertical plane parallel to a reference plane and is guided thereabout.

3. An attachment in combination with a glass cutter having a cutting wheel for scoring sheet glass, said attachment comprising:
   (A) a body member having at least one width dimension substantially equal to a transverse depth dimension;
   (B) clamp means adapted to secure the glass cutter proximate the cutting wheel to said body member at substantially the midpoint of said width dimension; and
   (C) support means depending downwardly from said body member and adapted to rest on the surface of the glass being scored,
      (a) said support means comprising a rib member extending parallel to the cutting wheel, the ends of said rib member and the peripheral edge of the wheel tangent to the glass defining a triangle in a horizontal plane whereby said body member is accurately positioned parallel to the plane of the glass.

References Cited in the file of this patent

UNITED STATES PATENTS

| | | |
|---|---|---|
| 167,575 | Sinsz | Sept. 7, 1875 |
| 2,178,755 | Johnson | Nov. 7, 1939 |
| 2,685,764 | Hatfield | Aug. 10, 1954 |
| 2,810,960 | Johnson et al. | Oct. 29, 1957 |
| 2,902,761 | Koenig | Sept. 8, 1959 |